United States Patent

Faxon et al.

[15] 3,637,531
[45] Jan. 25, 1972

[54] METHOD FOR MAKING CERAMIC TITANATE ELEMENTS AND MATERIALS THEREFOR

[72] Inventors: Robert C. Faxon, Attleboro, Mass.; Robert T. McGovern, Providence, R.I.

[73] Assignee: Texas Instruments Incorporated, Dallas, Tex.

[22] Filed: May 1, 1970

[21] Appl. No.: 33,962

Related U.S. Application Data

[63] Continuation-in-part of Ser. No. 651,992, July 10, 1967, abandoned.

[52] U.S. Cl. ................................252/520, 252/521, 23/51, 106/39
[51] Int. Cl. ..........................................................H01b 1/06
[58] Field of Search .....................252/519, 520, 521; 23/51; 106/39

[56] References Cited

UNITED STATES PATENTS

| | | | |
|---|---|---|---|
| 3,231,522 | 1/1966 | Blodgett et al. | 252/521 |
| 3,309,212 | 3/1967 | Lubalin | 106/39 |
| 3,340,074 | 9/1967 | Herczog | 252/520 |
| 3,351,568 | 11/1967 | Waseleski et al. | 106/39 |

*Primary Examiner*—Douglas J. Drummond
*Attorney*—Harold Levine, Edward J. Connors, Jr., John A. Haug, Gerald B. Epstein and James P. McAndrews

[57] ABSTRACT

A method for making ceramic titanate elements and materials therefor, particularly semiconducting lanthanide-doped barium titanate elements having positive temperature coefficients of resistance for use as solid-state sensors or the like, is shown to comprise the steps of dissolving the titanium chelate of triethanolamine with selected alkaline earth salts such as barium acetate and with selected lanthanide salts such as lanthanum acetate in a solvent to form a common solution. Alternatively, tetraisopropyl titanate mixed with lactic acid is combined with selected alkaline earth salts such as barium acetate and with selected lanthanide salts such as lanthanum acetate in a solvent to form a common solution. The solution is then heated, initially to form a semisolid material and thereafter—in an oxidizing or neutral atmosphere—to calcine the semisolid material to form the desired titanate material. The resulting titanate material is then combined with a binder, is pressed into a desired shape, and is fired at high temperature to form the desired ceramic titanate elements.

26 Claims, No Drawings

METHOD FOR MAKING CERAMIC TITANATE ELEMENTS AND MATERIALS THEREFOR

This application is a continuation-in-part of a previously filed, copending application Ser. No. 651,992 for patent entitled "Method for Making Ceramic Titanate Materials and Elements" filed by the coinventors hereof on July 10, 1967, which previously filed application was assigned to the assignee of the present application, and is now abandoned.

In known prior art methods for making semiconducting ceramic elements of titanate materials such as barium lanthanum titanate, considerable difficulty has been experienced in consistently reproducing materials of the desired physical and electrical properties. For example, in one prior art process, barium carbonate and lanthanum carbonate particles have been mechanically mixed together with titanium dioxide particles and have been calcined to produce a titanate material. This material is then pressed and fired to form the desired ceramic elements. In this process, impurities are introduced with the raw materials, particularly the titanium dioxide; the raw materials tend to be inadequately mixed, and additional contaminants are frequently introduced during the mechanical mixing; some undesirable crystalline transformations such as anatase-to-rutile transformation of titanium dioxide occurs during the process; and the ceramic-forming materials produced by the process frequently do not have the desired physical and electrical properties. Similarly, in a prior art wet chemical process, wherein raw materials are reacted in solution to form a titanate or intermediate titanium material within the solution, the desired reactions are difficult to control, the raw materials are expensive, and the process does not always produce ceramic-forming materials of the desired physical and electrical properties.

It is object of this invention to provide a novel and improved process for making titanate materials of perovskite structure; to provide such a process for making semiconducting, barium-titanate-based elements with a positive temperature coefficient of resistance for use as solid-state sensors and the like; to provide such a process which produces ceramic titanate elements of predictable and consistently reproducible physical and electrical characteristics; to provide such a process which utilizes inexpensive and commercially available raw materials; to provide such a process which is simple and inexpensively performed; to provide such a process which produces ceramic-forming titanate materials of desired physical and electrical characteristics at substantially lower costs than have previously been possible; and to provide such a process which is especially suited for commercial production purposes.

Briefly described, the novel and improved method of this invention includes the steps of combining reactant materials in at least one solvent to form a common solution. In this way, the reactant materials are provided with thorough mixing with respect to each other. The solution is then heated to produce a semisolid substance in which segregation of the homogeneously mixed reactants is significantly retarded. Heating of the substance is then continued in an oxidizing or neutral atmosphere for calcining the substance to form a desired titanate material.

In one embodiment of the process of this invention, for example, the titanium chelate of triethanolamine is combined with selected alkaline earth salts such as barium acetate or a mixture of barium acetate and strontium acetate in a common solution. The solution is then heated to form a gel and the gel is heated for calcining the noted materials to form the desired titanate material. This titanate material is then mixed with a binder, is pressed into the desired shape, and is fired at high temperature to form a ceramic titanate element of the desired physical and electrical characteristics.

In an alternate embodiment of the process of this invention, tetraisopropyl titanate is mixed with lactic acid and is combined with selected alkaline earth salts such as barium acetate in a common solution. The solution is then heated to form a foamlike substance and this substance is heated for calcining the noted materials to form the desired titanate material. This titanate is them processed to form ceramic titanate elements as above described.

In forming semiconducting ceramic titanate elements with positive temperature coefficients of resistance for use as solid-state sensors or the like in accordance with this invention, lanthanide salts such as lanthanum acetate or cerium acetate are incorporated in the materials above described. These lanthanide salts are added either to the common solution used in forming the gel or foamlike materials above described or are added to the calcined titanate materials together with the noted binder. In this way subsequent firing of the noted titanate materials in the manner above described produces the desired semiconducting ceramic titanate elements.

The use of an organic titanium compound, which is commercially available in highly purified form, avoids the introduction of impurities in the initial raw materials used in the process. The combination of the organic titanium compound and the alkaline earth and lanthanide salts in a common solution which is subsequently converted to semisolid form and calcined assures the formation of homogenous titanate materials. In addition because the titanium-bearing reactant employed in the process is not in the form of the titanium dioxide, crystalline transformation of the raw materials is avoided and production of materials of the desired perovskite structure is assured. Further the process is simply and inexpensively performed and consistently provides ceramic titanate elements of the desired electrical and physical properties.

Other objects, advantages, and details of the methods of this invention appear in the following detailed description of preferred embodiments of the invention.

In accordance with the method of this invention, ceramic-forming titanate materials and ceramic elements are produced from raw materials which are initially combined in a common solution. That is a first solution is prepared by dissolving the titanium chelate of triethanolamine in a selected solvent, preferably in a concentration comprising about 80 percent by weight of the organic compound. The preferred triethanolamine chelate dipropoxytitanium bis-(triethanolamine) having the formula $Ti(C_3H_7O)_2([C_2H_5O]_2NC_2H_5O)_2$, is represented by the following structure:

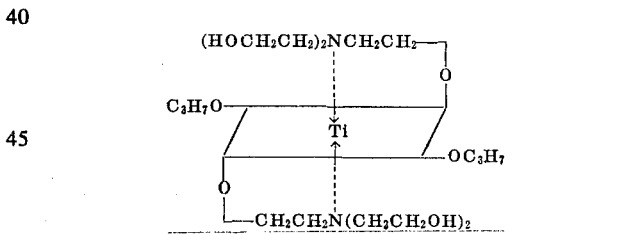

Preferably, the titanium chelate of triethanolamine is dissolved in isopropyl alcohol. This material is commercially available in the described solution from E. I. duPont de Nemours and Company, Inc. of Wilmington, Del. under the trade name TYZOR–TE, a product which represents a highly purified form of the organic substance.

A second solution is then prepared by dissolving an alkaline earth salt such as barium acetate in a solvent such as distilled water. Preferably a reagent grade of the salt is employed and a minimum amount of water is used for dissolving the selected alkaline earth salt.

These first and second solutions are then combined to form a common solution, sufficient quantities of the first and second solutions being employed so that the common solution embodies substantially equal molar quantities of the organic titanium compound and of the barium acetate material. In this regard, it is preferred that the molar quantity of the organic titanium compound slightly exceed the molar quantity of the barium salt in the common solution by as much as about 3 percent, and preferably by about 0.3 percent, for reasons to be hereinafter described. As the proportions of the organic titanium compound and alkaline earth salt used in the common solution are important, the raw materials used are preferably analyzed in any conventional manner prior to use to determine their exact content of active constituents.

After thorough mixing of the common solution to assure uniform distribution of the active constituents thereof, the common solution is preferably permitted to form a semisolid material or gel. Gelling will occur upon permitting the solution to stand for a sufficient period of time at room temperature, but preferably the common solution is gently heated at a temperature up to approximately 80° C. to induce gelation.

This semisolid material or gel is then heated in an oxidizing or neutral atmosphere for calcining the constituents of the gel or form the desired titanate material. This calcination can be performed in air in any conventional calcining furnace and the gel is preferably placed on a zirconia plate or platinum foil during calcination. It is found that the gel can be calcined at a temperature as low as 600° C., and temperatures as high as 1,150° C. have been used, but preferably the mixture is calcined at a temperature of about 950° C. for a period of at least 1 hour. During such calcining, the organic constituents of the original raw materials are oxidized and driven out of the mixture whereas the active constituents of the raw materials react to form the desired barium titanate material. In the heating process, the gel at first turns black and shrinks considerably. It then ignites and burns with a luminous flame, and finally forms white porous lumps of barium titanate. After cooling, these lumps are crushed or pulverized in any conventional manner to form a white powder which is then sieved to form a finely divided, particulate material.

Alternatively, a separate heating step for forming a gel is omitted. That is, the noted common solution is directly heated for calcining constituents of the solutions. In this arrangement, the initial heating of the solution tends to rapidly produce the semisolid substance or gel and subsequent heating results in driving off organic constituents of the gel and in reacting of the active constituents of the gel to form the desired barium titanate material.

In order to facilitate use of this calcined particulate material in forming ceramic titanate elements, a binder solution is preferably prepared and added to the particulate. For example, a saturated solution of polyvinyl alcohol in distilled water, embodying about 50 grams of polyvinyl alcohol per liter of water, is added to the calcined particulate and is thoroughly mixed with the particulate to form a smooth slurry. This slurry is then dried by mild heating to form a binder mixture. Preferably sufficient binder solution is used so that the resulting binder mixture embodies about 1 percent by weight polyvinyl alcohol.

The dried binder mixture is preferably but not necessarily subjected to isostatic or hydrostatic compaction at this stage in order to increase the density of the binder mixture to facilitate subsequent pressing of the mixture in forming ceramic elements. After isostatic compaction, the resulting compacted mixture is again crushed or pulverized and sieved.

The resulting barium titanate powder is then subjected to a final compaction in an appropriately shaped mold so that the mixture is pressed together to form an intermediate element of the desired shape. The binder mixture is preferably compacted under pressure on the order of 5,000 pounds per square inch to assure proper density of the element without introducing cracks or other defects in the element. The pressed intermediate element is then sintered or fused in air, preferably on a zirconia plate or platinum foil, for fusing the barium titanate particles together and for volatilizing and driving off the polyvinyl alcohol binder material. The intermediate element is fired at a temperature of at least about 1,300° C. and preferably at a temperature of about 1,450°C. to form the desired ceramic barium titanate elements. The slight excess of the titanium chelate or triethanolamine used in forming the described gel facilitates sintering or fusing of the barium titanate elements.

The barium titanate element formed by the process has the desired perovskite structure and displays high resistivity. Measurement of the capacitance of the barium titanate indicates that the element displays the anomalous characteristics in response to temperature change that are usually associated with ceramic titanate materials of perovskite structure. The element material displays a curie point of approximately 128° C.

In accordance with another embodiment of the method of this invention, semiconducting ceramic titanate elements with positive temperature coefficients of resistance for use as solid-state sensors or the like are also produced from raw materials which are initially combined in a common solution and subsequently gelled and calcined. That is, a first solution embodying the titanium chelate of triethanolamine is prepared in the manner above described. A third solution is then prepared by dissolving an alkaline earth salt such as barium acetate in a solvent such as distilled water together with a selected lanthanide salt such as lanthanum acetate or cerium acetate. For example, where the third solution is to be used in producing barium lanthanum titanate material having the empirical formula $Ba_{0.9985}La_{0.0015}Ti_{1.003}O_3$, 510.9 grams of barium acetate and 1.03 grams of lanthanum acetate are dissolved in a minimum amount of water to form the third solution.

These first and third solutions are then combined to form a common solution, sufficient quantities of the first and third solutions being employed so that the common solution embodies substantially equal molar quantities of the titanium chelate of triethanolamine and of the combination of the barium and lanthanum acetate. In this regard, it is preferred that the common solution embody a slight molar excess of triethanolamine for the purposes previously described.

After thorough mixing of this common solution, the solution is heated to form a gel and to calcine the gel in the manner previously described and forms the desired barium lanthanum titanate material in the forms of a dry particulate, the particulate then being combined with the binder material, pressed and fired in the manner above described for forming ceramic barium lanthanum titanate elements. These elements display very desirable semiconducting properties, display low resistivity at room temperature, have a curie point of about 125° C., and display a very high slope or increase in resistivity per degree centigrade rise in temperature close to 125°C.

In another embodiment of the method of this invention for making semiconducting ceramic titanate elements, first and second solutions are prepared in the manner described above with reference to the formation of barium titanate materials. These first and second solutions are then combined in appropriate quantities to form a common solution embodying substantially equal molar quantities of the titanium chelate of triethanolamine and of barium acetate. The common solution is then heated to form a gel and to calcine the gel in the manner previously described to form a dry barium titanate particulate.

An aqueous solution of a lanthanide salt such as lanthanum acetate is then prepared, preferably in a concentrated solution, and is combined with a quantity of the previously described aqueous polyvinyl alcohol binder solution. This combined lanthanide and binder solution is then added to the calcined barium titanate particulate described immediately above to form a smooth slurry, a sufficient quantity of the lanthanide and binder solution being used so that the slurry embodies about 0.15 mole percent of the lanthanide dopant. The slurry is then dried, pressed and fired in the manner previously described to form the desired ceramic barium lanthanum titanate elements having the empirical formula $Ba_{0.9985}La_{0.0015}Ti_{1.003}O_3$. These elements display the desirable semiconducting properties of the barium lanthanum titanate elements made by the method previously described.

In another embodiment of the method of this invention, ceramic titanate elements having a lower curie point are made by substituting an appropriate quantity of a strontium salt such as strontium acetate for a corresponding molar quantity of barium salt in any of the methods previously described. For example, in making a semiconducting titanate material having an 80° C. curie point, a first aqueous solution of the titanium chelate of triethanolamine is prepared in the manner above described. A fourth solution is then prepared by dissolving barium acetate and strontium acetate together with lanthanum acetate in distilled water, sufficient quantities of the salts being used so that the fourth solution embodies 84.85 mole percent barium acetate, 15 mole percent strontium acetate, and 0.15 mole percent lanthanum acetate. These first and fourth solutions are then combined to form a common solution embodying substantially equal molar quantities of the titanium chelate of triethanolamine and of the combination of the barium, strontium and lanthanum salts; the solution is gently heated to form a gel; and the gel is calcined in a manner previously described to form a barium strontium lanthanum titanate particulate material having the empirical formula $Ba_{0.8485}Sr_{0.1500}La_{0.0015}Ti_{1.003}O_3$. This particulate is then combined with a binder, is pressed and is fired in the manner described to form the desired semiconducting ceramic element having a curie point of about 80° C.

In another preferred embodiment of this invention, a master solution is prepared by dissolving tetraisopropyl titanate in a lactic acid solution such as in an aqueous lactic acid solution. For example, in a preferred arrangement, 1.25 kilograms of lactic acid (85 percent concentration by weight) is thoroughly mixed with 0.87 kilogram of deionized water. A quantity of 1.25 kilograms of tetraisopropyl titanate (embodying 16.8 percent titanium by weight) is then added to the lactic acid-water mixture, preferably in the form of small high-pressure streams of the tetraisopropyl titanate accompanied by vigorous mixing of the materials as they are combined. Pouring of the tetraisopropyl titanate into the lactic acid-water mixture, or too rapid addition thereof to the mixture, will tend to result in the formation of lumps and will tend to produce a rapid rise in solution temperature. Addition of tetraisopropyl titanate should be conducted slowly and should be regulated to maintain the solution temperature below about 65° C. to avoid excessively rapid formation of alcohol vapors over the solution, and to avoid ignition of such alcohol vapors.

While lactic acid is preferred for dissolving the tetraisopropyl titanate material other organic acids such as acetic acid and water-soluble alphahydroxy acids can also be used.

Preferably after a 24-hour dissolution period during which the solution is stirred substantially, the pH of the solution is adjusted to about 7.5 to 8.5 and preferably to about 8.0. Where this master solution is to be used immediately, this adjustment of solution pH is not absolutely required. However, for best results where the solution is to be made up well in advance of actual use of the solution, the noted pH adjustment serves to stabilize the solution. Adjustment of the pH is preferably accompanied by addition of ammonium hydroxide (28 percent concentration by weight for example). If dissolution of the tetraisopropyl titanate material in the solution is not complete after permitting the master solution to stand for an additional 24 hours, it will be desirable to filter the solution to remove floating particles of titanium dioxide and the like.

After preparation of this master solution, the solution is preferably analyzed by pyrolysis to precisely determine the effective titanium dioxide content of the solution. For example, a sample of the solution is preferably subjected to heating at a temperature of about 85° C. for about 8 hours to initiate solvent evaporation and is then heated to a temperature of about 900° to 1,000° C. to complete the pyrolysis. After analysis of the solution, the master solution is preferably stored in a tightly closed container to maintain solution concentrations.

In accordance with this invention, a selected quantity of this master solution required for producing a specific size of batch of ceramic-forming titanate material is segregated. A sufficient quantity of water and of a selected alkaline earth salt such as barium acetate are added to the segregated portion of the master solution to form a common solution which is hereinafter designated as a fourth solution. The quantity of barium acetate, or other alkaline earth salt, added to the segregated portion of the master solution is elected so that said fourth solution embodies substantially equal molar quantities of the organic titanium compound and of the barium acetate material. The quantity of water added to said segregated master solution is preferably selected to provide the fourth solution with an effective barium titanate content corresponding to about 15 percent barium titanate by weight. In this regard, the molar quantity of the organic titanium compound in the fourth solution preferably exceeds the molar quantity of barium acetate to a slight degree (by about 0.3 to 3.0 percent for reasons previously described). However, the fourth solution can also be prepared as a slightly barium-rich solution within the scope of this invention. After preparation of said fourth solution, the pH is then preferably adjusted, by addition of acetic acid or ammonium hydroxide for example, to render the fourth solution at least slightly acidic and preferably to provide the fourth solution with a pH of about 6.0.

After preparation and pH adjustment of said fourth solution, the solution is heated initially to form a semisolid substance or foam and subsequently to calcine the substance to form a desired titanate material. For example, is a preferred step according to this invention, said fourth solution is placed in a ceramic or quartz boat and is heated at a temperature in the range from about 650° to 1,150° C. in an oxidizing or neutral atmosphere until no carbon residue remains, thereby to rapidly produce the semisolid substance or foam and to calcine the barium and titanium ingredients of the solution. Preferably for example, the solution is heated to about 800° C. for about 1 hour or less for oxidizing and driving off the water and organic constituents of the solution while reacting the active constituents of the solution to produce the desired barium titanate material. In this heating process, the solution initially forms a semisolid substance of foamlike character which results in considerable expansion of the material in the boats. For this reason fairly large boats which are initially only partly filled with said fourth solution are used in this heating step. As heating of the semisolid, foam substance proceeds, the foam turns black and shrinks somewhat in volume and then ignites to burn with a luminous flame. Finally, at completion of the calcining step, the foam forms white porous lumps of barium titanate which are crushed or pulverized in any conventional manner to form a white powder, this powder then being sieved to form a finely divided particulate material. The powder resulting from performance of this latter embodiment of the process of this invention is characterized by a very high degree of uniformity throughout of body of the powder. Further, the powder particle size is desirable small resulting in improved voltage sensitivity characteristics in ceramic titanate elements subsequently formed with the powder.

After preparation of the desired barium titanate powder from said fourth solution in the manner above described, the powder can be combined with a binder, dried, passed to form an intermediate element of selected shape and is fired from forming ceramic titanate elements in the manner previously described. As will be understood, semiconducting ceramic titanate materials can also be made with barium titanate powders produced from said fourth solution by adding a selected lanthanide salt or salts to the barium titanate in the manner previously described. In addition, such semiconducting ceramic titanate elements can also be made in a manner similar to that previously described wherein a lanthanide salt is added to the fourth solution described above, the concentration of said fourth solution being modified so that the molar quantity of the organic titanium compound in the modified fourth solution substantially equals the sum of the molar quantities of alkaline earth and lanthanide salts in the solution. For example, a barium lanthanum titanate material having the empirical formula $Ba_{0.9985}La_{0.0015}Ti_{1.003}O_3$ such as previously described can be produced equally well beginning the process of this invention by producing said fourth solution or a modification of said fourth solution as it can by beginning the process of this invention with a combination of the first and second solutions or with the third solution previously described.

It can be seen that the methods above described, reactant materials for making ceramic-forming titanates are initially combined in a common solution so that the reactant materials are uniformly distributed with respect to each other. Use of the titanium chelate of triethanolamine or the tetraisopropyl titanate as the titanium-bearing reactant provides an inexpensive reactant material in highly purified form which is not subject to crystalline transformation during processing as is the titanium dioxide powder used in prior art processes. The rapid formation of a semisolid substance such as the noted gel or foam significantly retards any tendency of the uniformly distributed raw materials to segregate during reaction thereof so that, subsequent calcination and firing of the reactant materials initially combined in the common solution provide ceramic materials of excellent homogeneity and consistently reproducible physical and electrical characteristics in a process which is easily and inexpensively performed. The particle sizes in the ceramic titanate elements provided by this invention are also small to assure relatively low voltage sensitivities when the elements are used as solid-state sensors and the like.

It should be understood that although the methods of this invention have been described with reference to preferred embodiments of this invention, this invention includes all modifications and equivalents of the described methods which fall within the scope of the appended claims.

We claim:

1. A method for making a titanate material comprising the steps of combining an organic titanium material selected from the group consisting of titanium chelate of triethanolamine and tetraisopropyl titanate with at least one alkaline earth material in at least one solvent, reacting said materials to form a semisolid substance, and heating said substance to form said titanate material.

2. A method for making a ceramic-forming titanate material comprising the steps of combining an organic titanium compound selected from the group consisting of tetraisopropyl titanate dissolved in an organic acid and titanium chelate of triethanolamine with at least one alkaline earth salt in at least one solvent to form a common solution, heating said common solution to form a semisolid substance, and calcining said substance to form said ceramic-forming titanate material.

3. A method for making a titanate material comprising the steps of dissolving titanium chelate of triethanolamine and at least one alkaline earth salt in at least one solvent to form a gel, and heating said gel to form said titanate material.

4. A method for making a ceramic-forming titanate material comprising the steps of dissolving titanium chelate of triethanolamine and at least one alkaline earth salt in at least one solvent to form a common solution, heating said solution to form a gel, and calcining said gel to form said ceramic-forming titanate material.

5. A method as set forth in claim 4 wherein said solution is heated at a temperature up to about 80° C. to form said gel, and wherein said gel is heated at a temperature between 600° C. and 1,150° C. for at least 1 hour for calcining said gel to form said titanate material.

6. A method as set forth in claim 4 wherein said alkaline earth salt comprises barium acetate.

7. A method for making a titanate material for use in forming semiconducting ceramic elements comprising the steps of dissolving titanium chelate of triethanolamine, at least one alkaline earth salt, and at least one lanthanide salt in at least one solvent to form a common solution, heating said solution to form a gel, and heating said gel in an oxidizing atmosphere to form said titanate material.

8. A method for making a barium lanthanum titanate material of perovskite structure having a curie point of approximately 125° C. for use in forming semiconducting ceramic elements comprising the steps of dissolving titanium chelate of triethanolamine, barium acetate, and lanthanum acetate in at least one solvent to form a common solution, heating said solution at a temperature up to about 80° C. to form a gel, and heating said gel in an oxidizing atmosphere at a temperature between 600° C. and 1,150° C. to form said barium lanthanum titanate material.

9. A method for making semiconducting barium lanthanum titanate element comprising the steps as set forth in claim 8 and comprising the additional steps of adding a binder to said barium lanthanum titanate material, pressing said material to form an intermediate element of selected shape, and firing said intermediate element at a temperature of at least 1,300° C. to form said semiconducting barium lanthanum titanate elements.

10. A method for making a barium strontium lanthanum titanate material having a curie point substantially lower than 125° C. for use in forming semiconducting ceramic elements comprising the steps of combining titanium chelate of triethanolamine, barium acetate, strontium acetate, and lanthanum acetate in at least one solvent to form a common solution, heating said solution at a temperature up to about 80° C. to form a gel, and heating said gel in an oxidizing atmosphere at a temperature between 600° C. and 1,150° C. to form said barium strontium lanthanum titanate material.

11. A method for making semiconducting ceramic titanate elements comprising the steps of dissolving titanium chelate of triethanolamine and at least one alkaline earth salt in at least one solvent to form a common solution, heating said solution to form a gel, heating said gel in an oxidizing atmosphere to form a titanate material, combining said titanate material with an aqueous solution of a lanthanide salt and a binder material to form slurry, drying said slurry to form a lanthanide-doped binder mixture, pressing said binder mixture to form an intermediate element of selected shape, and firing said intermediate element at an elevated temperature to form said semiconducting ceramic titanate element.

12. A method as set forth in claim 11 wherein said alkaline earth salt comprises barium acetate.

13. A method as set forth in claim 11 wherein said alkaline earth salt comprises a mixture of barium acetate and strontium acetate.

14. A method as set forth in claim 11 wherein said lanthanide salt comprises lanthanum acetate.

15. A method for making a titanate material comprising the steps of dissolving tetraisopropyl titanate with an organic acid selected from the group consisting of acetic acid and water-soluble alphahydroxy acids and with at least one alkaline earth salt in a solvent to form a common solution, and heating said solution to form a foamlike substance and to calcine said substance to form said titanate material.

16. A method for making a ceramic-forming titanate material comprising the steps of dissolving tetraisopropyl titanate in a lactic acid solution and adding at least one alkaline earth salt to said solution, heating said solution to form a foamlike substance, and calcining said foamlike substance to form said ceramic-forming titanate material.

17. A method as set forth in claim 16 wherein said solution is heated at a temperature between 600° C. and 1,150° C. for at least 1 hour for forming said foamlike substance and for calcining said foamlike substance to form said titanate material.

18. A method as set forth in claim 16 wherein said alkaline earth salt comprises barium acetate.

19. A method for making a titanate material for use in forming semiconducting ceramic elements comprising the steps of dissolving tetraisopropyl titanate in an aqueous lactic acid solution and adding at least one alkaline earth salt and at least one lanthanide salt in said solution to form a common solution, heating said common solution to form a foamlike substance, and heating said foamlike substance in an oxidizing atmosphere to form said titanate material.

20. A method for making a barium lanthanum titanate material of perovskite structure having a curie point of approximately 125° C. for use in forming semiconducting ceramic elements comprising the steps of dissolving tetraisopropyl titanate in an aqueous lactic acid solution and adding barium acetate and lanthanum acetate therein to form a common solution, heating said common solution at a temperature between 600° C. and 1,150° C. to form a foamlike substance and to calcine said substance to form said barium lanthanum titanate material.

21. A method for making a semiconducting barium lanthanum titanate element comprising the steps as set forth in claim 20 and comprising the additional steps of adding a binder to said barium lanthanum titanate material, pressing said material to form an intermediate element of selected shape, and firing said intermediate element at a temperature of at least 1,300° C. to form said semiconducting barium lanthanum titanate elements.

22. A method for making a barium strontium lanthanum titanate material having a curie point substantially lower than 125° C. for use in forming semiconducting ceramic elements comprising the steps of combining tetraisopropyl titanate dissolved in lactic acid with barium acetate, strontium acetate, and lanthanum acetate in at least one solvent to form a common solution, heating said solution at a temperature between 600° C. and 1,150° C. to form a foamlike substance and to calcine said substance to form said barium strontium lanthanum titanate material.

23. A method for making semiconducting ceramic titanate elements comprising the steps of dissolving tetraisopropyl titanate in an aqueous solution of lactic acid, adding at least one alkaline earth salt to said solution, heating said solution in an oxidizing atmosphere to form a foamlike substance and to calcine said substance to form a titanate material, combining said titanate material with an aqueous solution of a lanthanide salt and a binder material to form a slurry, drying said slurry to form a lanthanide-doped binder mixture, pressing said binder mixture to form an intermediate element of selected shape, and firing said intermediate element at an elevated temperature to form said semiconducting ceramic titanate element.

24. A method as set forth in claim 23 wherein said alkaline earth salt comprises barium acetate.

25. A method as set forth in claim 23 wherein said alkaline earth salt comprises a mixture of barium acetate and strontium acetate.

26. A method as set forth in claim 23 wherein said lanthanide salt comprises lanthanum acetate.

* * * * *